(12) United States Patent
Lee et al.

(10) Patent No.: US 12,145,122 B2
(45) Date of Patent: Nov. 19, 2024

(54) APPARATUS FOR MANUFACTURING QUANTUM DOT AND QUANTUM DOT MANUFACTURING METHOD USING THE SAME

(71) Applicant: Samsung Display Co., Ltd., Yongin-si (KR)

(72) Inventors: Taekjoon Lee, Hwaseong-si (KR); Baek Hee Lee, Seoul (KR); Junwoo Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1040 days.

(21) Appl. No.: 17/068,708

(22) Filed: Oct. 12, 2020

(65) Prior Publication Data

US 2021/0229060 A1    Jul. 29, 2021

(30) Foreign Application Priority Data

Jan. 29, 2020    (KR) .................. 10-2020-0010382

(51) Int. Cl.
*B01J 19/00* (2006.01)
*B01J 14/00* (2006.01)
(Continued)

(52) U.S. Cl.
CPC .......... *B01J 19/0093* (2013.01); *B01J 14/00* (2013.01); *C01B 21/0602* (2013.01);
(Continued)

(58) Field of Classification Search
CPC ............... B01J 19/0093; B01J 14/00; B01J 2219/00792; B01J 2219/00862;
(Continued)

(56) References Cited

U.S. PATENT DOCUMENTS

| 6,262,129 B1 | 7/2001 | Murray et al. |
| 2014/0264171 A1* | 9/2014 | Schut ............... C01G 21/21 |
| | | 204/157.43 |

(Continued)

FOREIGN PATENT DOCUMENTS

| JP | 2017-135223 A | 8/2017 |
| KR | 10-1180980 B1 | 9/2012 |

(Continued)

OTHER PUBLICATIONS

Wang, Hongzhi et al., "Continuous synthesis of CdSe—ZnS composite nanoparticles in a microfluidic reactor," Chem. Commun., 2004, pp. 48-49.

(Continued)

*Primary Examiner* — Mohammed R Alam
(74) *Attorney, Agent, or Firm* — Lewis Roca Rothgerber Christie LLP (57) ABSTRACT

An apparatus for manufacturing a quantum dot is provided, the apparatus including a first supplying part that provides a cationic precursor, a second supplying part that provides an anionic precursor, a mixing part connected to the first supplying part and the second supplying part, and a reaction part including a reaction tube configured to receive a liquid mixture of the cationic precursor and the anionic precursor from the mixing part and a first microwave generator configured to provide a microwave that is transmitted through the reaction tube. Therefore, the apparatus may produce a quantum dot of multi-element compounds.

20 Claims, 10 Drawing Sheets

(51) Int. Cl.
*C01B 21/06* (2006.01)
*C01B 21/097* (2006.01)
*C01B 25/08* (2006.01)
*C09K 11/08* (2006.01)
*B82Y 20/00* (2011.01)
*B82Y 40/00* (2011.01)

(52) U.S. Cl.
CPC .......... *C01B 21/097* (2013.01); *C01B 25/088* (2013.01); *C09K 11/08* (2013.01); *B01J 2219/00792* (2013.01); *B01J 2219/00831* (2013.01); *B01J 2219/00833* (2013.01); *B01J 2219/00862* (2013.01); *B01J 2219/00869* (2013.01); *B01J 2219/00889* (2013.01); *B01J 2219/00941* (2013.01); *B82Y 20/00* (2013.01); *B82Y 40/00* (2013.01)

(58) Field of Classification Search
CPC .... B01J 2219/00869; B01J 2219/00889; B01J 2219/00941; B01J 2219/00882; B01J 19/126; B01J 2219/0295; B01J 2219/1296; C01B 21/0602; C01B 21/097; C01B 25/088; C09K 11/08; C09K 11/70; C09K 11/7492; C09K 11/75; B82Y 20/00; B82Y 40/00

See application file for complete search history.

(56) References Cited

U.S. PATENT DOCUMENTS

2017/0189879 A1* 7/2017 Simsek .................. B01J 13/04
2019/0032241 A1 1/2019 Novet et al.

FOREIGN PATENT DOCUMENTS

KR 10-1874811 B1 7/2018
KR 10-2019-0073130 A 6/2019

OTHER PUBLICATIONS

Tamang, Sudarsan et al., "Chemistry of InP Nanocrystal Syntheses," Chem. Mater., 2016, vol. 28, pp. 2491-2506.
Gerbec, Jeffrey A. et al., "Microwave-Enhanced Reaction Rates for Nanoparticle Synthesis," J. Am. Chem. Soc., 2005, vol. 127, No. 45, pp. 15791-15800.

* cited by examiner

APPARATUS FOR MANUFACTURING QUANTUM DOT AND QUANTUM DOT MANUFACTURING METHOD USING THE SAME

CROSS-REFERENCE TO RELATED APPLICATION

This application claims priority to and the benefit of Korean Patent Application No. 10-2020-0010382 (KIPO), filed on Jan. 29, 2020, the entire content of which is incorporated by reference herein.

BACKGROUND

1. Field

One or more embodiments of the present disclosure relate to an apparatus for manufacturing a quantum dot and a quantum dot manufacturing method using the same, and more particularly, to an apparatus for manufacturing a quantum dot containing a plurality of different elements and a quantum dot manufacturing method using the same.

2. Description of the Related Art

In recent years, various display devices have been developed for use in multimedia devices, such as televisions, mobile phones, tablet computers, navigation systems, game machines, and the like. In the display devices, a so-called self-luminous display element is used to perform display, where a light emitting material containing an organic compound emits light.

In addition, in order to improve color reproducibility of the display device, light emitting elements using a quantum dot as a light emitting material have been developed, and in order to obtain various light emission wavelengths, research into a quantum dot containing three or more different elements has been conducted. Accordingly, there is a need for a method for effectively manufacturing and producing a quantum dot containing a plurality of elements.

SUMMARY

Aspects of one or more embodiments of the present disclosure are directed toward an apparatus for manufacturing a quantum dot, which allows the quantum dot containing three or more components to be synthesized.

Aspects of one or more embodiments of the present disclosure are directed to an apparatus for manufacturing a quantum dot and a quantum dot manufacturing method using the same, which allow mass production.

Aspects of one or more embodiments of the present disclosure are directed toward an apparatus for manufacturing a quantum dot, the apparatus including: a first supplying part configured to provide a cationic precursor; a second supplying part configured to provide an anionic precursor; a mixing part connected to the first supplying part and the second supplying part; and a reaction part including a reaction tube configured to receive a liquid mixture of the cationic precursor and the anionic precursor from the mixing part and a first microwave generator configured to provide a microwave that is transmitted through the reaction tube.

In an embodiment, the reaction tube may include a microfluidic channel provided in a zigzag form on a plane.

In an embodiment, the reaction tube may be formed of glass, quartz, or Teflon.

In an embodiment, the cationic precursor may contain at least one of In, Ga, or Al.

In an embodiment, the anionic precursor may contain at least one of P, As, N, or Sb.

In an embodiment, the first microwave generator may be disposed on at least one side of the reaction tube.

In an embodiment, the reaction part may include a second microwave generator spaced apart from the first microwave generator with the reaction tube being interposed therebetween.

In an embodiment, the reaction tube may include: an inlet at a first end of the reaction tube; an outlet at a second end of the reaction tube, the first end being closer to the mixing part than the second end; and a transferring part between the inlet and the outlet, the transferring part including a plurality of sub reaction parts arranged repeatedly in a U shape.

In an embodiment, the reaction tube may further include a first sub inlet and a second sub inlet branched from the inlet, and a first sub outlet and a second sub outlet merged into the outlet, the transferring part may include a first transferring part and a second transferring part on a same plane, and the first transferring part may be between the first sub inlet and the first sub outlet and the second transferring part may be between the second sub inlet and the second sub outlet.

In an embodiment, the reaction tube may include a first sub reaction tube defined by a first plane and a second sub reaction tube respectively defined by a second plane, the first and the second planes being spaced apart from and parallel to each other.

In an embodiment, the mixing part may be heated to a temperature of about 100° C. to about 150° C.

In an embodiment, the microwave may have an energy of about 260 W or more.

In an embodiment, an inner diameter of the reaction tube may be about 0.1 mm to about 5.0 mm.

In an embodiment, the apparatus may include a cooling part connected to an end of the reaction part.

In an embodiment of the present disclosure, a quantum dot manufacturing method includes providing a cationic precursor from a first supplying part and an anionic precursor from a second supplying part, the first supplying part being separate from the second supplying part; mixing the cationic precursor and the anionic precursor in a mixing part; and supplying a liquid mixture of the cationic precursor and the anionic precursor to a reaction tube through which a microwave is transmitted and synthesizing a multi-element compound comprising at least one cationic element contained in the cationic precursor and the at least one anion element contained in the anionic precursor by providing the microwave to the liquid mixture.

In an embodiment, the cationic precursor may contain at least one of In, Ga, or Al, and the anionic precursor may contain at least one of P, As, N, or Sb.

In an embodiment, the multi-element compound may be a tri-element compound of GaNP, GaNAs, GaNSb, GaPAs, GaPSb, AlNP, AlNAs, AlNSb, AlPAS, AlPSb, InGaP, InAlP, InNP, InNAs, InNSb, InPAs, or InPSb.

In an embodiment, the multi-element compound may be a tetra-element compound of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, or InAlPSb.

In an embodiment, the mixing may be performed at about 100° C. to about 150° C., and the synthesizing of the multi-element compound may be performed at about 250° C. to about 350° C.

In an embodiment, the method may further include cooling the synthesized multi-element compound.

BRIEF DESCRIPTION OF THE FIGURES

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

It is to be understood that the present disclosure may be variously modified and embodied, and thus particular embodiments thereof will be illustrated in the drawings and described in detail in the present specification. However, this is not intended to limit the present invention to the specific disclosed form, it should be understood to include all modifications, equivalents, and substitutes included in the spirit and scope of the present disclosure.

In the present specification, it will be understood that when an element (or region, layer, part, or the like) is referred to as being "on", "connected to" or "coupled to" another element, it can be directly on, connected or coupled to the other element or intervening elements may be present.

Meanwhile, in the present application, it will be understood that the expression "directly disposed", may refer to no additional intervening layer, film, region, plate, or the like is present between a part such as a layer, film, region, plate, or the like and other parts. For example, the expression "directly disposed" may refer to two layers or two members are disposed without using an additional member, such as an adhesive member, between the two layers or two members.

Like numbers refer to like elements throughout. In the drawings, the thicknesses, the ratios and the dimensions of the elements are exaggerated for effective description of the technical contents.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. For example, without departing from the teachings of the present disclosure, a first element could be termed a second element, and similarly, a second element could be termed a first element. The singular forms, "a", "an" and "the" are intended to include the plural forms as well, unless the context clearly indicates otherwise.

Terms, such as "beneath", "below", "lower", "above", "upper" and the like, may be used herein for ease of description to describe one element or feature's relationship to another element(s) or feature(s) as illustrated in the figures. It will be understood that the terms are spatially relative terms and are to be described with reference to the orientation depicted in the figures.

As used herein, expressions such as "at least one of", "one of", and "selected from", when preceding a list of elements, modify the entire list of elements and do not modify the individual elements of the list.

Further, the use of "may" when describing embodiments of the present disclosure refers to "one or more embodiments of the present disclosure".

As used herein, the terms "substantially", "about", and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

As used herein, the terms "use," "using," and "used" may be considered synonymous with the terms "utilize," "utilizing," and "utilized," respectively. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will be interpreted expressly as being defined here unless interpreted in an idealized or overly formal sense.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, an apparatus for manufacturing a quantum dot (quantum dot manufacturing apparatus) and a quantum dot manufacturing method using the same according to an embodiment of the present disclosure will be described with reference to the drawings.

Figure 1:
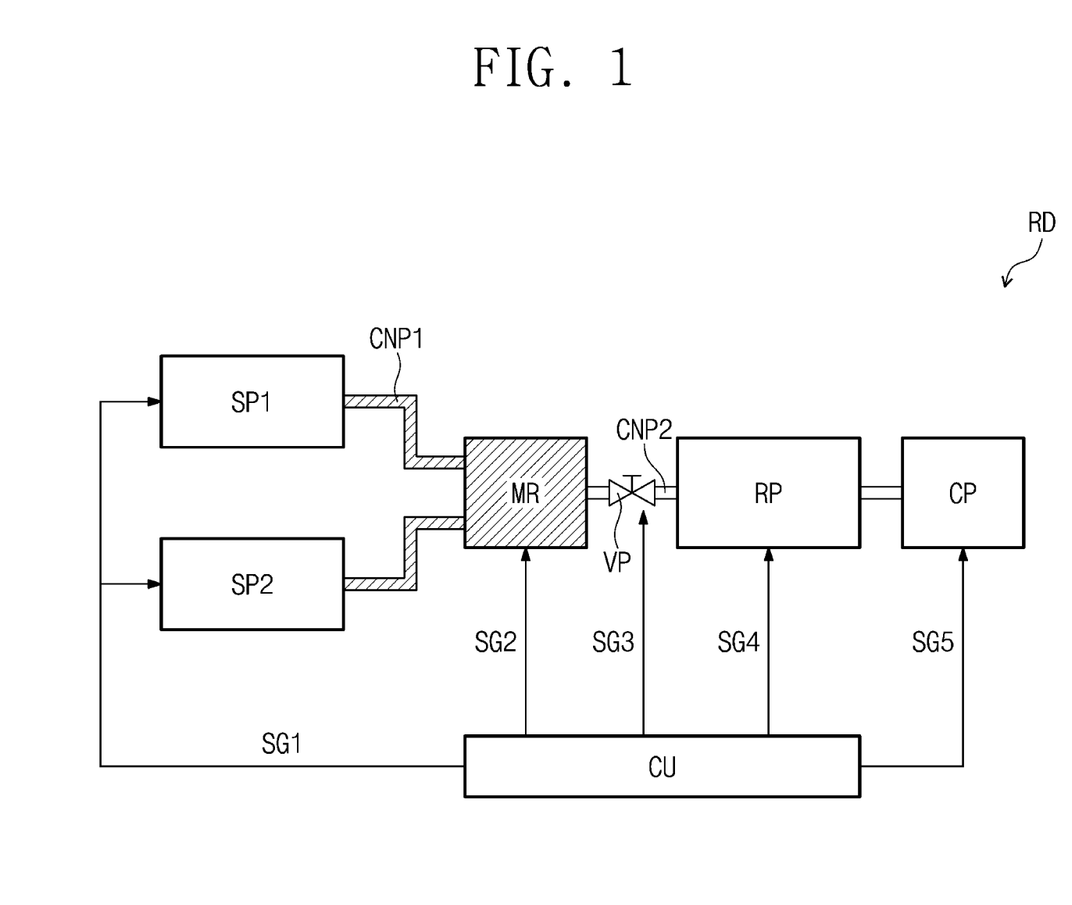
FIG. 1 is a schematic diagram of an apparatus for manufacturing a quantum dot (quantum dot manufacturing apparatus) of an embodiment.
Figure 2:
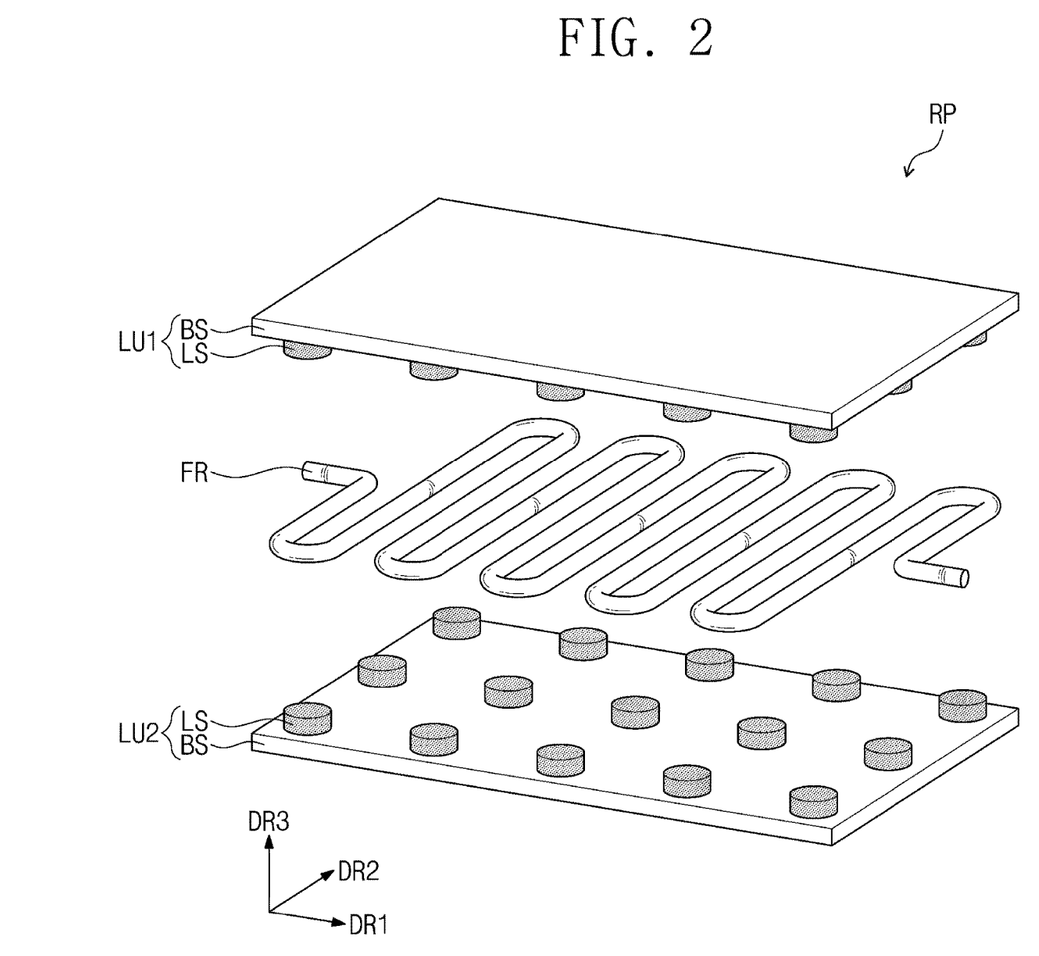
FIG. 2 is a perspective view illustrating a part of the quantum dot manufacturing apparatus according to an embodiment.
Figure 3:
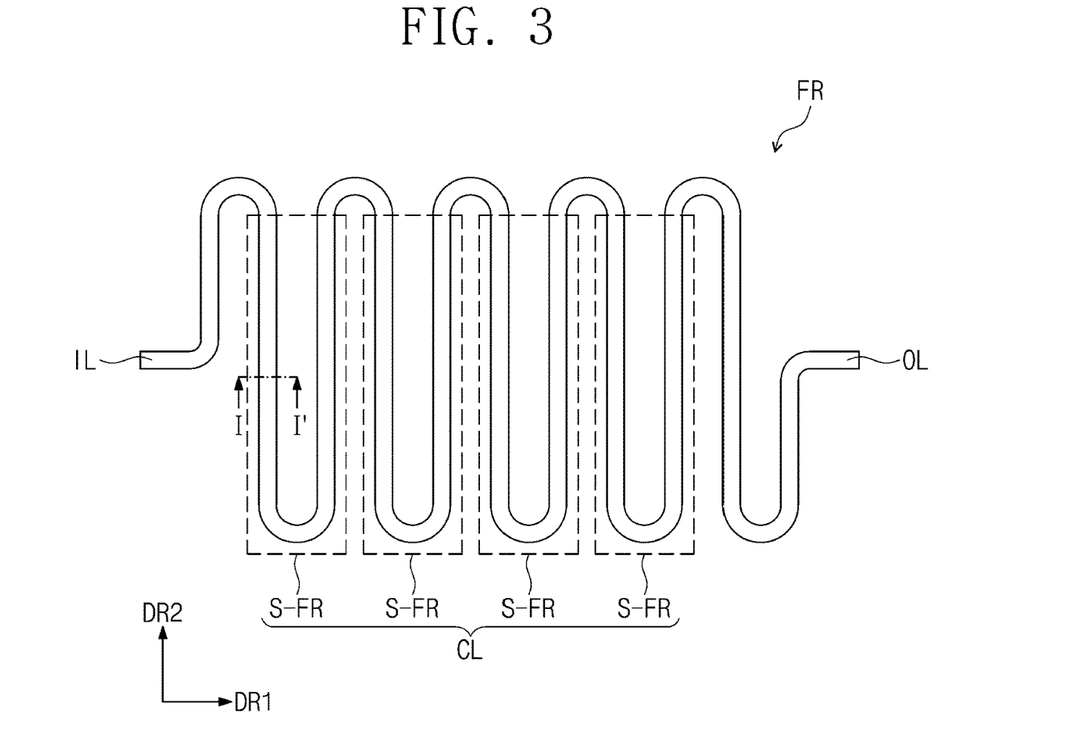
FIG. 3 is a perspective view illustrating a reaction tube according to an embodiment.
Figure 4:
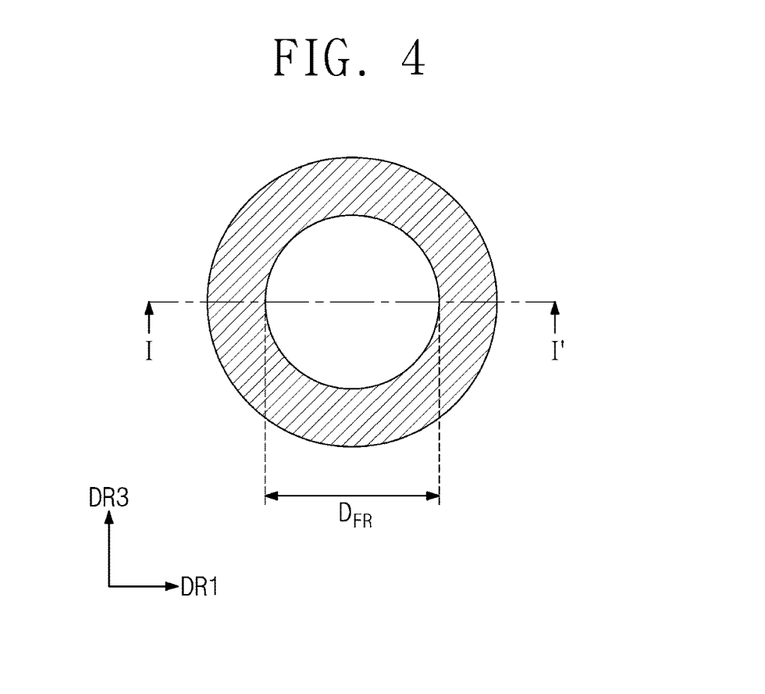
FIG. 4 is a cross-sectional view taken along the line I-I' illustrating a part of the reaction tube according to an embodiment.

FIG. 1 is a schematic diagram illustrating a configuration of the quantum dot manufacturing apparatus RD of an embodiment. FIG. 2 is a perspective view illustrating a reaction part RP included in the quantum dot manufacturing apparatus of an embodiment. FIGS. 3 and 4 are views illustrating parts of a reaction tube included in the quantum dot manufacturing apparatus of an embodiment. FIG. 3 is a plan view illustrating a reaction tube according to an embodiment, and FIG. 4 is a cross-sectional view of a taken along the line I-I' of FIG. 3.

Referring to FIG. 1, the quantum dot manufacturing apparatus RD of an embodiment may include a first supplying part SP1 and a second supplying part SP2, which are separated or spaced apart from each other, a mixing part MR connected to the first supplying part SP1 and the second supplying part SP2, and a reaction part RP connected to the mixing part MR. A cooling part CP may be disposed at the end of the reaction part RP. In addition, the quantum dot manufacturing apparatus RD may include a controller CU that controls operations of the supplying parts SP1 and SP2, the mixing part MR, and the reaction part RP. In one or more embodiments, the controller CU controls the temperature of the cooling part CP.

Precursors for the manufacturing of the quantum dot may be provided through the supplying parts SP1 and SP2. A cationic precursor for the manufacturing of the quantum dot may be provided through the first supplying part SP1, and an anionic precursor therefor may be provided through the second supplying part SP2.

The cationic precursor stored in the first supplying part SP1 and provided through the first supplying part SP1 may contain at least one of In, Ga, or Al. In ions, Ga ions, Al ions, or the like may be contained in the form of dispersed salt in an octadecene solvent. For example, In may be provided in the form of In(OA)$_3$ in the octadecene solvent, and Ga may be provided in the form of Ga(OA)$_3$ in the octadecene solvent where "OA" refers to oleic acid.

The anionic precursor stored in the second supplying part SP2 and provided through the second supplying part SP2 may contain at least one of P, As, N, or Sb. P ions, As ions, N ions, Sb ions, or the like, may be included in the form of dispersed salt in a trioctylphosphine solvent. For example, the P element may be provided in the form of P(TMS)$_3$ in the trioctylphosphine solvent where "TMS" refers to trimethylsilyl.

Here, the state in which the cationic precursor and the anionic precursor are provided are not limited to the above-described embodiments except that the cationic precursor and the anionic precursor are provided from separate supplying parts, and solvents other than the solvents mentioned above or other forms of salt may be provided.

The first supplying part SP1 and the second supplying part SP2 may receive a first control signal SG1 provided from the controller CU to adjust supply amounts of the cationic precursor and the anionic precursor, respectively. The cationic precursor provided from the first supplying part SP1 and the anionic precursor provided from the second supplying part SP2 may be provided to the mixing part MR through supply pipes CNP1. The supply pipes CNP1 correspond to portions (e.g., separate supply pipes spaced apart from each other) connecting the first supplying part SP1 and the mixing part MR and connecting the second supplying part SP2 and the mixing part MR, respectively. The supply pipes CNP1 and the mixing part MR may be formed of a material that is opaque and has high chemical resistance. For example, the supply pipe CNP1 and the mixing part MR may be formed of stainless steel (SUS).

The cationic precursor and the anionic precursor are stirred and mixed in the mixing part MR. The mixing part MR may include a heating unit. The mixing part MR may be heated to a temperature of about 100° C. to about 150° C. A second control signal SG2 provided through or by the controller CU may control the temperature and the stirring speed of the mixing part MR.

The liquid mixture of the cationic precursor and the anionic precursor mixed in the mixing part MR is provided to the reaction part RP. In the reaction part RP, a quantum dot is synthesized from the cationic precursor and the anionic precursor.

A flow rate controller VP may be disposed between the mixing part MR and the reaction part RP. In one or more embodiments, the flow rate controller VP may be connected between the mixing part MR and the reaction part RP. The flow rate controller VP may be any unit (e.g., valve) suitable for controlling the supply amount of the liquid mixture provided to the reaction part RP. The flow rate controller VP may receive a third control signal SG3 provided through or by the controller CU and control the amount of the liquid mixture provided from the mixing part MR to the reaction part RP and the speed of providing the liquid mixture.

The mixing part MR and the reaction part RP may be connected to a connection unit CNP2. The connection unit CNP2 may be a moving tube that delivers the liquid mixture provided from the mixing part MR to the reaction part RP. The flow rate controller VP may be added to the connection unit CNP2. In one or more embodiments, the flow rate controller VP serves or functions as a valve (e.g., may be a valve), and the flow rate controller VP may control the flow rate and the like of the liquid mixture supplied through the connection unit CNP2.

The reaction part RP may include a reaction tube FR, which is a portion (e.g., a tube) where the liquid mixture is provided and the synthetic reaction is produced, and microwave generators LU1 and LU2 that provide a microwave to the reaction tube FR. The operation of the reaction part RP may be controlled by a fourth control signal SG4 provided by the controller CU. The fourth control signal SG4 may control the moving speed of the reactants in the reaction tube FR, the power of the microwave generated from the microwave generators LU1 and LU2, the microwave irradiation time, and the like.

The reaction tube FR may be formed of a material through which the microwave is transmitted. For example, the reaction tube FR may be formed of glass, quartz, and/or Teflon material. However, the one or more embodiments of the present disclosure are not limited thereto and any material may be used without limitation as long as the material may transmit the microwave and has chemical resistance to the cationic precursor and the anionic precursor that are reactants.

The reaction tube FR may be a microfluidic channel provided in a zigzag form on a plane. In other words, the reaction tube FR extends in a zigzag or serpentine direction along a plane. In one or more embodiments, the reaction tube FR may be in the form of a microfluidic reactor provided to increase the area of the reactor to facilitate mass production. Referring to FIGS. 2 and 3, the reaction tube FR is provided on a plane defined by a first direction axis DR1 and a second direction axis DR2, and may be provided in a bent form periodically repeated. In one or more embodiments, the reaction tube FR includes straight sections and curved sections. Two straight sections from among the straight sections and one curved section from among the curved sections may form a "U" shape. The "U" shape may be repeated along the first direction axis DR1. In one or more embodiments, the straight sections of adjacent "U" shape portions (e.g., adjacent "U" shape portions separated by a curved portion) of the reaction tube FR are parallel to each other.

The reaction tube FR may include an inlet IL disposed at a first end of the reaction tube FR to be connected to the mixing part MR (e.g., connected through the flow rate controller VP), an outlet OL disposed at a second end of the reaction tube FR, and a transferring part CL disposed between the inlet IL and the outlet OL. The transferring part CL may be a portion including a plurality of sub reaction parts S-FR arranged repeatedly in a "U" shape. The plurality of sub reaction parts S-FR may be connected to each other and may be provided in a zigzag form.

The inner diameter DFR of the reaction tube FR may be about 0.1 mm or more and about 5.0 mm or less. In other words, the inner diameter DFR of the reaction tube FR may be about 0.1 mm to about 5.0 mm. When the inner diameter DFR is less than about 0.1 mm, the area of the reaction tube FR may be reduced, thereby reducing the productivity of the quantum dot manufacturing apparatus. In addition, when the inner diameter DFR is greater than about 5.0 mm, the microwave may not be sufficiently delivered to the center of the reaction tube FR, thereby decreasing the uniformity of the quantum dot material synthesized in the reaction tube FR.

Although FIGS. 2 and 3 illustrate that the arrangement intervals of the sub reaction parts S-FR are constant, and the sizes (widths) of the sub reaction parts S-FR are substantially the same, embodiments of the present disclosure are not limited thereto. The size of the tubes of the sub reaction parts S-FR, the arrangement interval between neighboring sub reaction parts S-FR, and the like, may be designed differently depending on the type of the quantum dot to be manufactured.

The microwave generator LU1 or LU2 may be disposed on at least one side of the reaction tube FR. The microwaves provided by the microwave generator LU1 or LU2 may be used as the energy source for the synthesis of the cationic precursor and the anionic precursor. The microwave generators LU1 and LU2 include a magnetron LS. In the quantum dot manufacturing apparatus RD of an embodiment, the microwave generators LU1 and LU2 may include a plurality of magnetrons LS and a support body BS for fixing the magnetrons LS. In other words, the magnetrons LS of the microwave generators LU1 and LU2 may be coupled to or attached to corresponding support bodies BS as illustrated in FIG. 2.

In the quantum dot manufacturing apparatus RD of an embodiment, the microwave generators LU1 and LU2 may be disposed above and below the reaction tube FR, respectively. In an embodiment illustrated in FIG. 2, the reaction tube FR may be disposed between two microwave generators LU1 and LU2. The two microwave generators LU1 and LU2 may be spaced apart from each other and facing each other. However, one or more embodiments of the present disclosure are not limited thereto, and the microwave generators LU1 and LU2 may be disposed only above or only below the reaction tube FR. In other words, the microwave generators LU1 and LU2 may be disposed at or proximate to one side of the reaction tube FR.

With reference to FIG. 2, the microwave generators LU1 and LU2 are illustrated as being disposed on a plane parallel to the plane on which the reaction tube FR is disposed, but one or more embodiments of the present disclosure are not limited thereto. In order to effectively deliver the microwaves into the reaction tube FR, the microwave generators LU1 and LU2 may be further disposed on the side of the reaction tube FR, and may be disposed to be inclined to the plane on which the reaction tube FR is disposed. In other words, the microwave generators LU1 and LU2 may be disposed on a plane that crosses or intersects the plane on which the reaction tube FR is disposed. In addition, the number and arrangement method of the magnetrons LS included in the microwave generators LU1 and LU2 may vary depending on the shape and size of the reaction tube FR. Therefore, in one or more embodiments, any suitable number and arrangement of magnetrons LS may be used depending on the size and shape of the reaction tube FR.

The microwaves generated by the microwave generators LU1 and LU2 may have an energy of about 260W or more. For example, the energy of the microwave generated in each of the plurality of magnetrons LS may be about 260W or more. In one or more embodiments, the plurality of magnetrons LS included in the microwave generators LU1 and LU2 may all be controlled to emit microwaves of the same power or to emit microwaves of different powers.

In addition, in the reaction part RP, the energy of a microwave, which is generated from the magnetron LS corresponding to the reaction tube FR adjacent to the mixing part MR, and the energy of a microwave, which is generated from the magnetron LS corresponding to the portion adjacent to the end of the reaction tube FR may be different from each other. For example, the value of the energy of the microwave emitted by the magnetron LS corresponding to the portion of the reaction tube FR adjacent to the mixing part MR may be greater than the value of the energy of a microwave emitted by the magnetron LS corresponding to the portion of the reaction tube FR spaced apart from the mixing part MR. In other words, the value of the energy of a microwave emitted by the magnetron LS may vary along the length of (i.e., in the flow direction of) the reaction tube FR. However, one or more embodiments of the present disclosure are not limited thereto.

The internal temperature of the reaction part RP in which the microwave is provided may be increased to a temperature of about 250° C. to about 300° C. That is, in the mixing part MR, the cationic precursor and the anionic precursor are mixed at a temperature range of about 100° C. to about 150° C., and then, in the reaction part RP, the temperature of the mixture of the cationic precursor and the anionic precursor or the reactants thereof may be increased to a temperature of about 250° C. to about 300° C. by the provided microwave.

Figure 5:
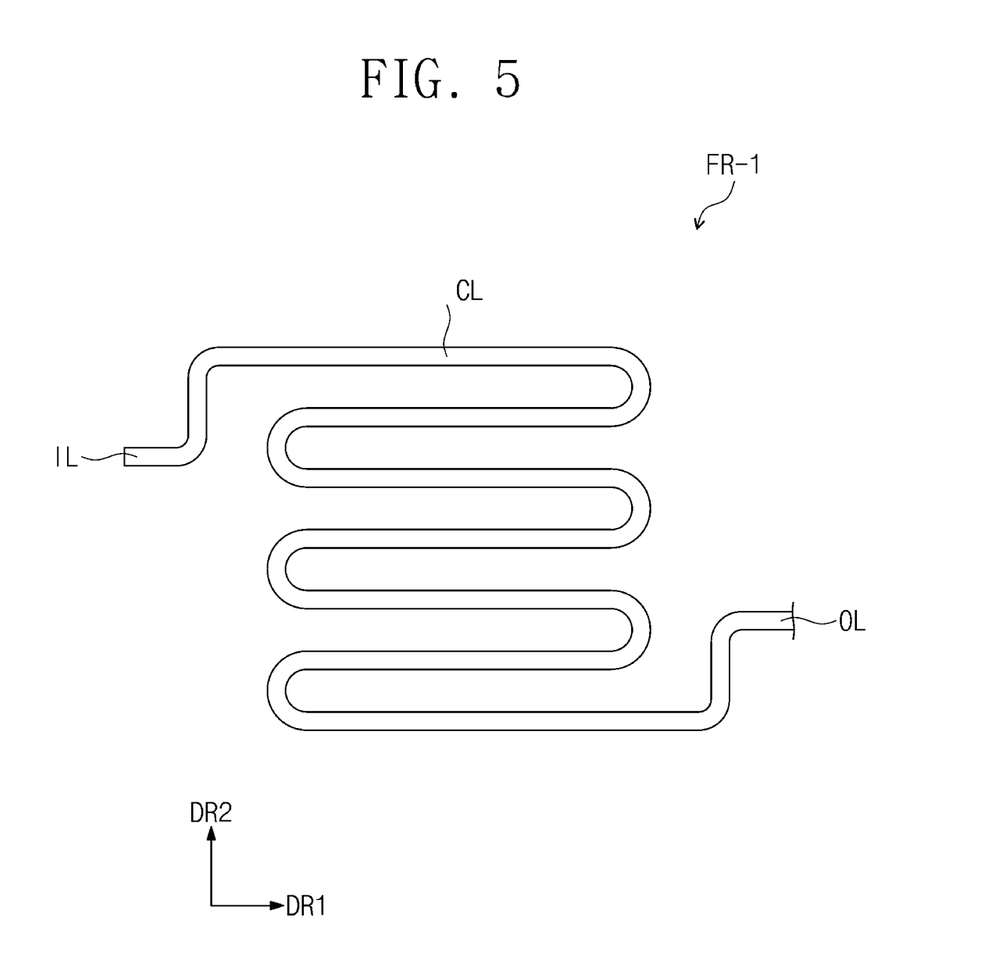
FIGS. 5 and 6 are plan views illustrating reaction tubes according to embodiments, respectively.

In the reaction tube FR, the transferring part CL may be provided in various forms between the inlet IL and the outlet OL. In the reaction tube FR illustrated in FIGS. 2 and 3, the transferring part CL may have a shape (e.g., a U-shape) that is periodically repeated along the first direction axis DR1. Further, referring to FIG. 5, the transferring part CL of a reaction tube FR-1 may have a shape that is periodically repeated along the second direction axis DR2.

Figure 6:
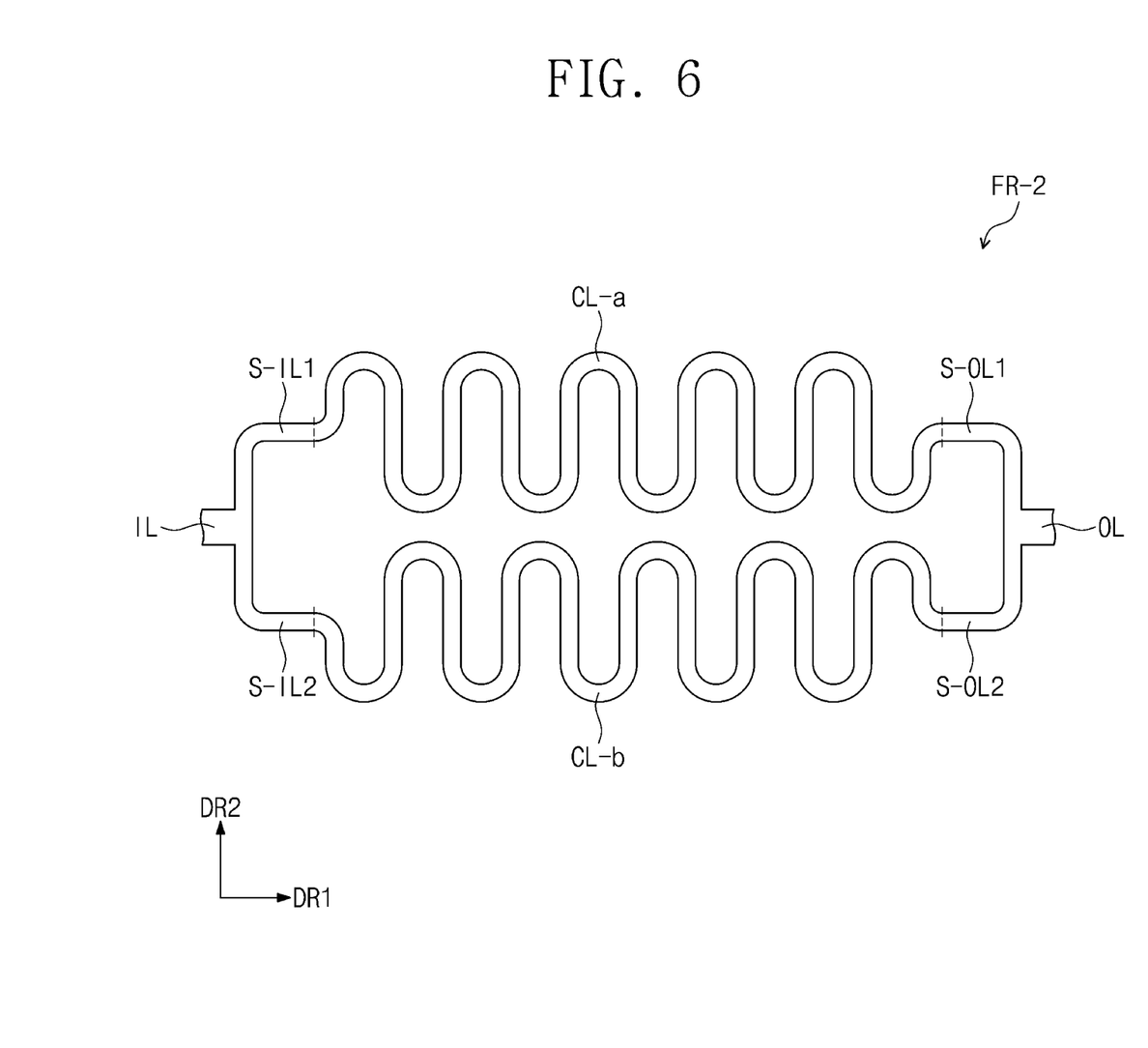

The reaction tube of an embodiment may include a plurality of transferring parts disposed between the inlet and the outlet. Referring to FIG. 6, in an embodiment, a reaction tube FR-2 may include two transferring parts CL-a and CL-b disposed between one inlet IL and one outlet OL and separated or spaced apart from each other. The first transferring part CL-a and the second transferring part CL-b may be on the same plane. The reaction tube FR-2 may include a first sub inlet S-IL1 and a second sub inlet S-IL2 branched from the inlet IL through which the liquid mixture to be supplied from the mixing part MR is introduced. In other words, the first sub inlet S-IL1 and the second sub inlet S-IL2 may be branched from the inlet IL at the first end of the reaction tube FR-2. In addition, the reaction tube FR-2 may include a first sub outlet S-OL1 and a second sub outlet S-OL2 merged into the outlet OL corresponding to the second end of the reaction tube FR-2. The first transferring part CL-a is a portion disposed between (e.g., connected between) the first sub inlet S-IL1 and the first sub discharge port S-OL1, and the second transferring part CL-b is a portion disposed between (e.g., connected between) the second sub inlet S-IL2 and the second sub outlet S-OL2. That is, the quantum dot manufacturing apparatus RD of an embodiment may include a plurality of transferring parts in order to improve productivity by increasing the area (e.g., surface area) of the reaction tube FR-2. In FIG. 6, only two transferring parts CL-a and CL-b are illustrated, but one or more embodiments of the present disclosure are not limited thereto. For example, three or more transferring parts may be provided. In addition, one inlet IL and one outlet OL are illustrated in the embodiment illustrated in FIG. 6, but one or more embodiments of the present disclosure are not limited thereto. Each of the sub inlets S-IL1 and S-IL2 may be connected to the mixing part MR, and the synthesized quantum dot may be derived from each of the sub outlets S-OL1 and S-OL2. In other words, one or more embodiments of the present disclosure include multiple inlets and/or outlets.

Figure 7:
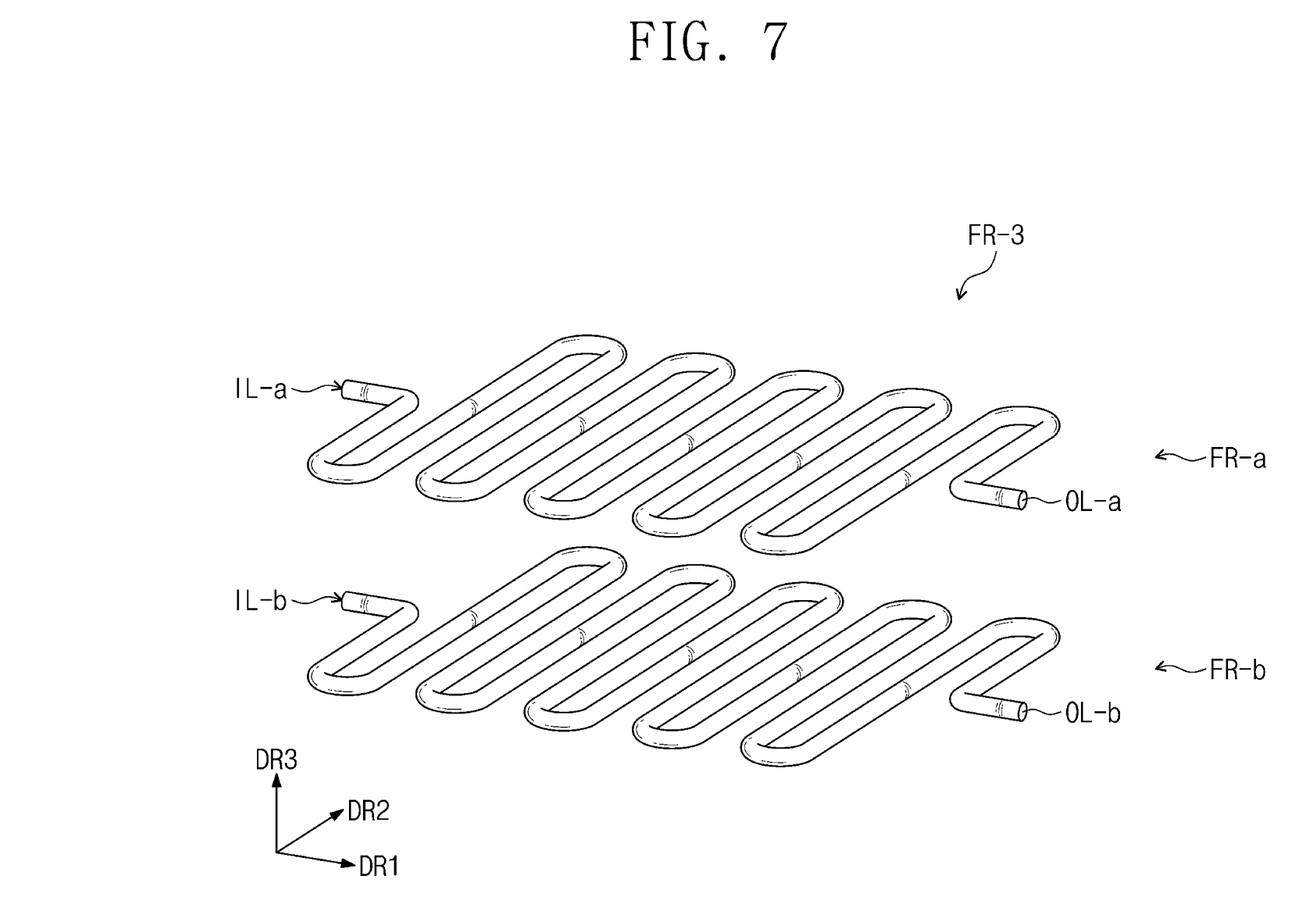
FIG. 7 is a perspective view illustrating a reaction tube according to an embodiment.

FIG. 7 is a perspective view illustrating an embodiment of a reaction tube FR-3 of another shape. Referring to FIG. 7, in the quantum dot manufacturing apparatus RD of an embodiment, the reaction tube FR-3 may include a plurality of sub reaction tubes including a first sub reaction tube FR-a and a second sub reaction tube FR-b. The first sub reaction tube FR-a and the second sub reaction tube FR-b may be provided on two planes spaced apart from each other and parallel to each other. In an embodiment illustrated in FIG. 7, the first sub reaction tube FR-a and the second sub reaction tube FR-b may be arranged on the plane parallel to the plane defined by the first direction axis DR1 and the second direction axis DR2 and may be spaced apart from each other along the third direction axis DR3 perpendicular to or normal to the plane defined by the first direction axis DR1 and the second direction axis DR2. The inlet IL-a of the first sub reaction tube FR-a and the inlet IL-b of the second sub reaction tube FR-b may be connected to the side close to the mixing part MR. The quantum dot synthesized from each of the outlet OL-a of the first sub reaction tube FR-a and the outlet OL-b of the second sub reaction tube FR-b may be derived. With respect to other features (e.g., the materials and shapes) of the first sub reaction tube FR-a and the second sub reaction tube FR-b, the description of the reaction tube FR described with reference to FIGS. 2-4 may apply to the first sub reaction tube FR-a and the second sub reaction tube FR-b and will not be repeated.

Although the forms of the reaction tubes FR, FR-1, FR-2, and FR-3 according to one or more embodiments are illustrated by way of example in FIGS. 2-7, one or more embodiments of the present disclosure are not limited thereto. For example, a reaction tube formed of a material through which the microwave is transmitted may be designed in various suitable forms in order to widen the reaction area and may be used in the quantum dot manufacturing apparatus of one or more embodiments.

The quantum dot manufactured from the liquid mixture of the cationic precursor and the anionic precursor provided in the mixing part MR may be a multi-element compound containing three or more elements. For example, the quantum dot manufactured by the synthesis in the reaction part RP of the quantum dot manufacturing apparatus of one or more embodiments may be a multi-element compound such as a tri-element compound of GaNP, GaNAs, GaNSb, GaPAs, GaPSb, AlNP, AlNAs, AlNSb, AlPAS, AlPSb, InGaP, InAlP, InNP, InNAs, InNSb, InPAs, or InPSb. In one or more embodiments, the quantum dot manufactured by the synthesis in the reaction part RP may be a tetra-element compound of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, or InAlPSb. However, one or more embodiments of the present disclosure are not limited thereto, and the type of the quantum dot manufactured may suitably vary depending on the type of the cationic precursor and the anionic precursor provided.

The quantum dot manufacturing apparatus RD of an embodiment may further include the cooling part CP. The cooling part CP may be a portion that is connected to the reaction part RP to rapidly quench the multi-element compound synthesized in the reaction part RP. The controller CU may control the temperature of the cooling part CP by providing a fifth control signal SG5. In the cooling part CP, the multi-element compound discharged from the reaction part RP may be cooled to a temperature of about 20° C. to about 50° C.

The quantum dot manufacturing apparatus of an embodiment uses a microwave as an energy source to provide a sufficient reaction energy to the reactants without heating the reaction part to a high temperature, and thus, may be used for the manufacturing of the quantum dot of multi-element compounds containing more than three elements. That is, the quantum dot manufacturing apparatus of an embodiment includes a microwave generator and a reaction tube through which the microwaves are transmitted to reduce the difference in the reaction rate between different elements reacted in the reaction tube by the microwave, thereby making it possible to enable the production of the quantum dot of the multi-element compound containing more than three elements. In addition, the quantum dot manufacturing apparatus of an embodiment may be used for mass production of quantum dots by shortening the reaction time by providing a superheating energy using the microwave as a reaction energy source.

Figure 8:
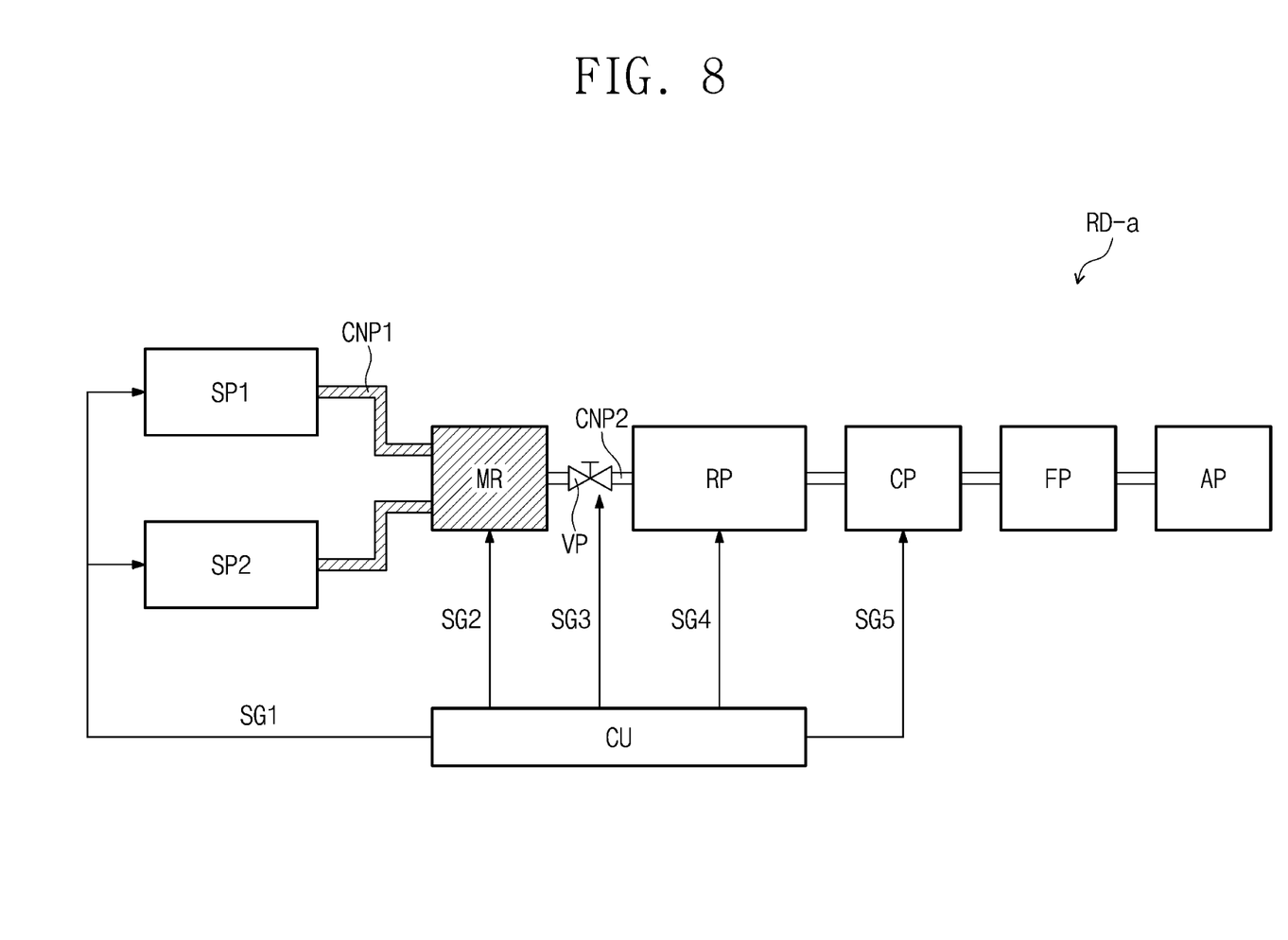
FIG. 8 is a schematic diagram illustrating a quantum dot manufacturing apparatus of an embodiment.

FIG. 8 is a schematic diagram illustrating a quantum dot manufacturing apparatus RD-a of an embodiment. The quantum dot manufacturing apparatus RD-a of an embodiment may further include a purification unit FP, a measuring unit AP, and the like as compared with the quantum dot manufacturing apparatus RD of the embodiment described with reference to FIG. 1.

Quantum dot material synthesized in the reaction part RP may be washed and filtered in the purification unit FP. In the purification unit FP, reaction by-products, reaction residues, unreacted precursor materials, and the like, generated in the reaction part RP may be separated, and a final quantum dot material may be obtained.

The final quantum dot material separated in the purification unit FP may be identified by the measuring unit AP. The measuring unit AP may check the size of the manufactured quantum dot, the light emission wavelength of the quantum dot, and the like.

Figure 9:
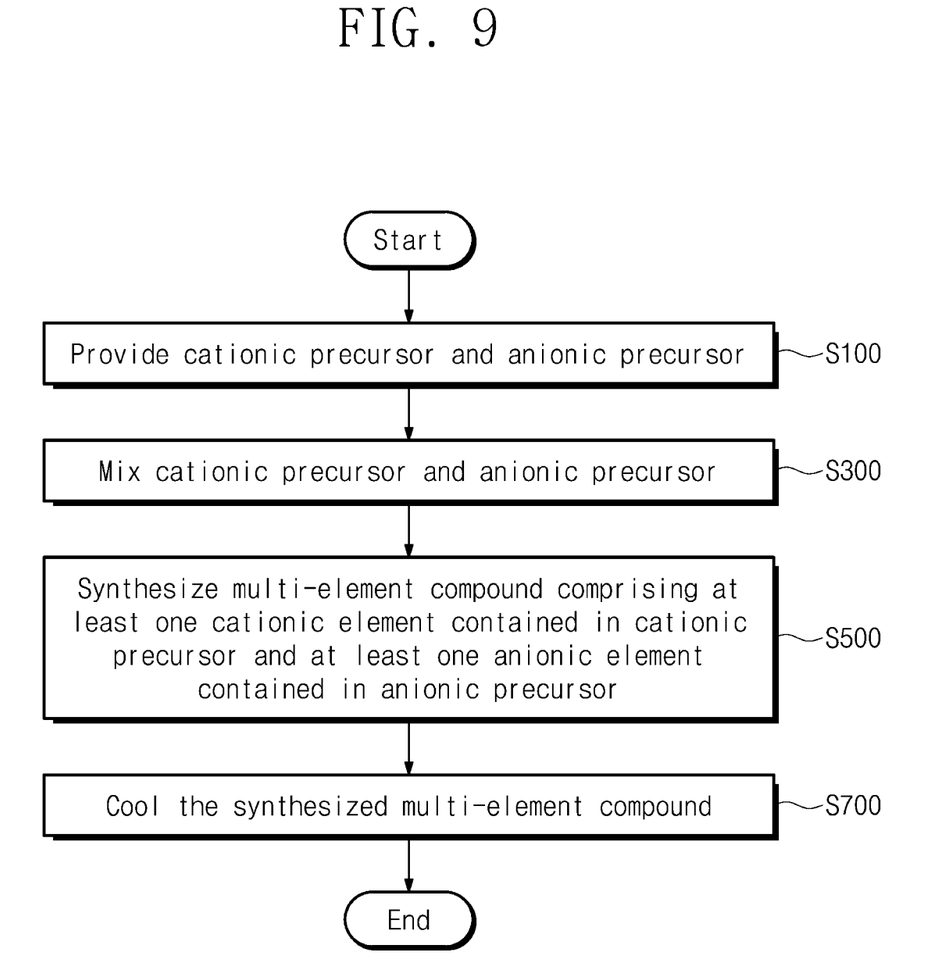
FIG. 9 is a flowchart illustrating a quantum dot manufacturing method according to an embodiment.

FIG. 9 is a flowchart illustrating a quantum dot manufacturing method an embodiment. The quantum dot manufacturing method of an embodiment corresponds to a manufacturing method using the quantum dot manufacturing apparatus of the above-described embodiment.

The quantum dot manufacturing method of an embodiment may include providing a cationic precursor and an anionic precursor (S100), mixing the cationic precursor and the anionic precursor (S300), synthesizing a multi-element compound comprising (e.g., containing) at least one cationic element contained in the cationic precursor and the at least one anion element contained in the anionic precursor (S500), and cooling the synthesized multi-element compound (S700).

The providing of the cationic precursor and the anionic precursor (S100) may be performed using the first and second supplying parts SP1 and SP2 of the quantum dot manufacturing apparatus RD of the above-described embodiment. The cationic precursor and the anionic precursor may be provided from each of the separated first supplying part SP1 and the second supplying part SP2. The cationic precursor provided from the first supplying part SP1 may contain at least one of In, Ga, or Al, and the anionic precursor provided from the second supplying part SP2 may contain at least one of P, As, N, or Sb.

The cationic precursor and the anionic precursor provided from the first supplying part SP1 and the second supplying part SP2 may be mixed in the mixing part MR. The mixing of the cationic precursor and the anionic precursor (S300) may be performed at a temperature of about 100° C. to about 150° C.

The synthesizing of the multi-element compound from the cationic precursor and the anionic precursor (S500) may be performed in the reaction part RP. The liquid mixture of the cationic precursor and the anionic precursor mixed in the mixing part MR is supplied to the reaction tube FR, and the microwave is provided to the reaction tube FR. The reaction tube FR corresponds to one formed of a material through which the microwave is transmitted. By providing a microwave to the liquid mixture passing through the reaction tube FR, the multi-element compound containing at least one cationic element contained in the cationic precursor and at least one anionic element contained in the anionic precursor may be synthesized.

The microwave provided to the reaction tube FR in the synthesizing of the multi-element compound (S500) may be one having an energy of about 260 W or more. The temperature of the reaction tube FR irradiated with the microwave may be increased to a temperature of about 250° C. to about 350° C. That is, in the synthesizing of the multi-element compound (S500), the temperature may be about 250° C. to about 350° C., which is higher than the temperature of the mixing of the cationic precursor and the anionic precursor (S300).

The synthesized multi-element compound corresponds to the quantum dot. For example, the multi-element compound manufactured in the synthesizing of the multi-element compound (S500) may be a tri-element compound of GaNP, GaNAs, GaNSb, GaPAs, GaPSb, AlNP, AlNAs, AlNSb, AlPAs, AlPSb, InGaP, InAlP, InNP, InNAs, InNSb, InPAs, or InPSb, or a tetra-element compound of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, or InAlPSb.

The method may further include cooling the synthesized multi-element compound (S700), after or in response to the synthesizing of the multi-element compound (S500). The cooling of the multi-element compound (S700) may be performed at about 20° C. to about 50° C. A quantum dot in a stable state may be obtained by rapidly cooling the multi-element compound which has been synthesized in the reaction part RP and then discharged.

Figure 10:
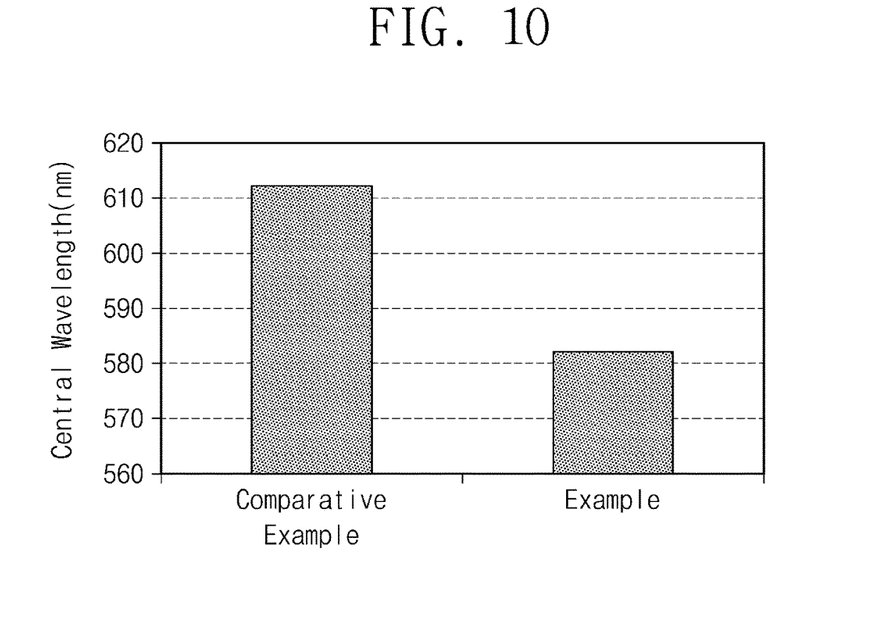
FIG. 10 is a graph illustrating a result of evaluating features of quantum dots manufactured using quantum dot manufacturing apparatuses of a comparative example and an example.
Figure 11:
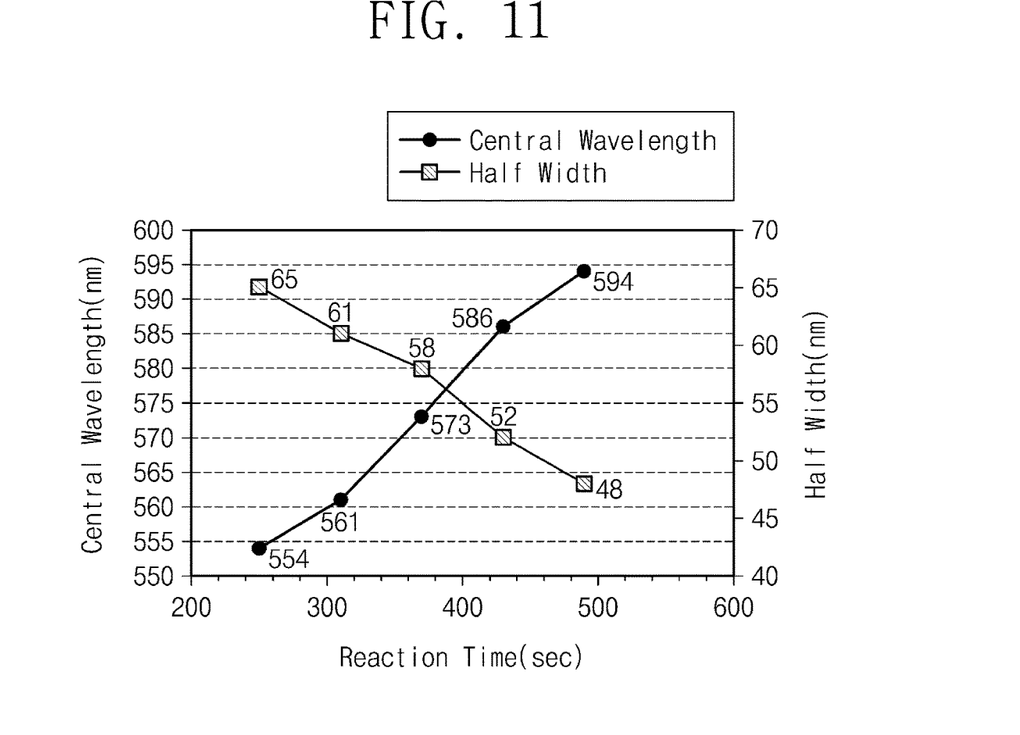
FIG. 11 is a graph illustrating a result of evaluating features of a quantum dot according to control conditions of a reaction part.
Figure 12:
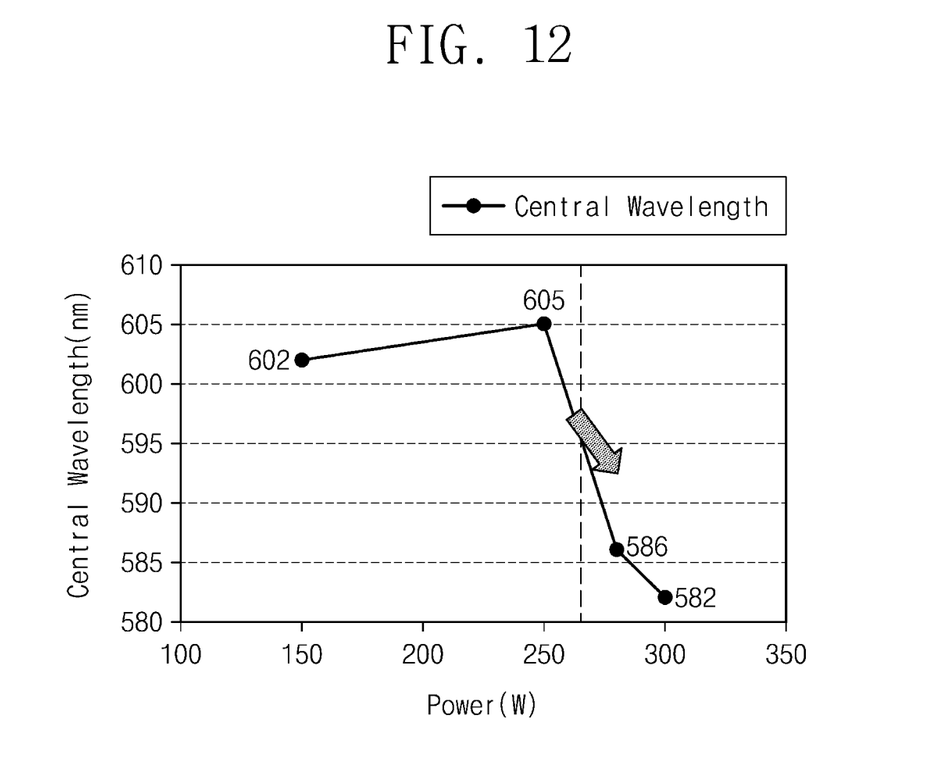
FIG. 12 is a graph illustrating a result of evaluating features of a quantum dot according to control conditions of a reaction part.

FIGS. 10 and 12 illustrate the results of checking physical properties of the quantum dot manufactured by the quantum dot manufacturing method of an embodiment.

In FIG. 10, the central wavelength of the quantum dot of the comparative example manufactured using a typical quantum dot manufacturing apparatus and the central wavelength of the quantum dot manufactured using the quantum dot manufacturing apparatus according to an embodiment of the present disclosure are illustrated for comparison. The precursor materials used in the comparative example and the example illustrated in FIG. 10 were prepared identically. As a cationic precursor material, a liquid mixture of about 2.5 ml of an ODE (octadecene) solvent, about 1 ml (about 0.05 mmol, about 1 eq) of $In(OA)_3$ at about 0.5 M concentration, and about 1.5 ml (about 0.15 mmol, about 0.3 eq) of $Ga(OA)_3$ at about 0.1 M concentration was used. As the anionic precursor material, a solution of a TOP (trioctylphosphine) solvent and about 0.45 ml (about 0.3 mmol, about 0.5 eq) of $P(TMS)_3$ was used.

In the comparative example of FIG. 10, the quantum dot is the one manufactured using a heat mixing method, which is a typical quantum dot manufacturing method. In the manufacturing method of the comparative example, the mixed cationic precursor and anionic precursor solution was heated to about 280° C. This is the temperature corresponding to the process temperature when the microwave having a power of about 280 W is provided. In the example of FIG. 10, the quantum dot is the one manufactured by using the quantum dot manufacturing method of an embodiment where the liquid mixture identical to that in the comparative example was reacted with the microwave of about 280 W by using the quantum dot manufacturing apparatus of an embodiment. Referring to the result of FIG. 10, in the case of the comparative example, it can be confirmed that the manufactured quantum dot is InP on the basis of the fact that the light emission central wavelength of the manufactured quantum dot is about 612 nm. In comparison, in the case of the example, it can be confirmed that the manufactured quantum dot is InGaP on the basis of the fact that the light emission central wavelength of the manufactured quantum dot is about 582 nm. That is, it can be confirmed that when using the quantum dot manufacturing apparatus of an embodiment and the quantum dot manufacturing method of an embodiment using the same, the quantum dot of the multi-element compound of three or more components can be synthesized even when using the same reactant as compared to when using the typical quantum dot manufacturing apparatus.

FIG. 11 is a graph illustrating a result of checking whether physical properties of the manufactured quantum dot are changed according to reaction conditions in the quantum dot manufacturing method using the quantum dot manufacturing apparatus of an embodiment. Referring to FIG. 11, it can be confirmed that the optical properties of the manufactured quantum dot are adjusted according to the reaction time, that is, the microwave providing time, in the reaction part of the quantum dot manufacturing apparatus. It can be seen that when the microwave is irradiated for about 250 sec. to about 500 sec. with an energy of about 280 W, the light emission central wavelength changes to a longer wavelength and the half width at the light emission peak decreases as the reaction time increases. That is, when the irradiation time of the microwave is controlled in consideration of the desired optical properties of the quantum dot, it is possible to manufacture the quantum dot satisfying the desired optical properties.

FIG. 12 is a graph illustrating evaluation results of optical properties of the quantum dot manufactured by using the precursor materials used in the experiment of FIG. 10 and changing the power of the microwave provided to the reaction part. Referring to FIG. 12, it can be seen that when other reaction conditions are the same, the light emission wavelength of the manufactured quantum dot shifts to shorter wavelength as the power of the provided microwave increases. In particular, it can be confirmed that, from the fact that when the microwave is provided with a power of about 260 W or more, the light emission wavelength of the manufactured quantum dot is reduced to about 590 nm or less, when the microwave having an energy of about 260 W or more is provided, the quantum dot of the multi-element compound with three or more components are manufactured.

The quantum dot manufacturing apparatus of an embodiment uses a microwave as an energy source, and includes a microfluidic channel reaction tube through which the microwave is transmitted and may be provided in a large area in the reaction part, thereby enabling mass production of quantum dots without a high temperature process. Using the quantum dot manufacturing method of an embodiment and using the quantum dot manufacturing apparatus of an embodiment, it is possible to easily produce a quantum dot of a multi-element compound containing at least three elements.

The quantum dot manufacturing apparatus of an embodiment may include a reaction tube and a microwave generator including a microfluidic channel, and thus, may be used for synthesis of the quantum dot containing three or more elements. The quantum dot manufacturing method of an embodiment may be used for producing a large amount of quantum dots by using a microwave as an energy source without using a high temperature process.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

Therefore, the technical scope of the present disclosure should not be limited to the contents described in the detailed description in the specification but should be defined by the claims, and equivalents thereof.

What is claimed is:

1. An apparatus for manufacturing a quantum dot, the apparatus comprising:
   a first supplying part configured to provide a cationic precursor;
   a second supplying part configured to provide an anionic precursor;
   a mixing part connected to the first supplying part and the second supplying part; and
   a reaction part comprising a reaction tube configured to receive a liquid mixture of the cationic precursor and the anionic precursor from the mixing part and a first microwave generator configured to provide a microwave that is transmitted through the reaction tube, the first microwave generator being on a first plane parallel to a second plane on which the reaction tube is on, and the first and second planes being perpendicular to a thickness direction of the first microwave generator, the thickness direction being parallel to the transmission direction of the microwave, and
   wherein an extension direction of the reaction tube is on the second plane.

2. The apparatus of claim 1, wherein the reaction tube comprises a microfluidic channel provided in a zigzag form on the second plane on which the reaction tube is on.

3. The apparatus of claim 1, wherein the reaction tube is formed of glass, quartz, or Teflon.

4. The apparatus of claim 1, wherein the cationic precursor contains at least one of In, Ga, or Al.

5. The apparatus of claim 1, wherein the anionic precursor contains at least one of P, As, N, or Sb.

6. The apparatus of claim 1, wherein the first microwave generator is disposed on at least one side of the reaction tube.

7. The apparatus of claim 6, wherein the reaction part further comprises a second microwave generator spaced apart from the first microwave generator with the reaction tube being interposed therebetween.

8. The apparatus of claim 1, wherein the reaction tube comprises:
   an inlet at a first end of the reaction tube;
   an outlet at a second end of the reaction tube, the first end being closer to the mixing part than the second end being to the mixing part; and
   a transferring part between the inlet and the outlet, the transferring part comprising a plurality of sub reaction parts arranged repeatedly in a U shape.

9. The apparatus of claim 8, wherein the reaction tube further comprises a first sub inlet and a second sub inlet branched from the inlet, and a first sub outlet and a second sub outlet merged into the outlet,
   the transferring part comprises a first transferring part and a second transferring part on a same plane, and
   the first transferring part is between the first sub inlet and the first sub outlet, and the second transferring part is between the second sub inlet and the second sub outlet.

10. The apparatus of claim 1, wherein the reaction tube comprises a first sub reaction tube defined by a first sub plane and a second sub reaction tube respectively defined by a second sub plane, the first and the second sub planes being spaced apart from each other and parallel to each other.

11. The apparatus of claim 1, wherein the mixing part is heated to a temperature of about 100° C. to about 150° C.

12. The apparatus of claim 1, wherein the microwave has an energy of about 260 W or more.

13. The apparatus of claim 1, wherein an inner diameter of the reaction tube is about 0.1 mm to about 5.0 mm.

14. The apparatus of claim 1, further comprising a cooling part connected to an end of the reaction part.

15. A quantum dot manufacturing method, the method comprising:
   providing a cationic precursor from a first supplying part and an anionic precursor from a second supplying part, the first supplying part being separate from the second supplying part;
   mixing the cationic precursor and the anionic precursor in a mixing part; and
   supplying a liquid mixture of the cationic precursor and the anionic precursor to a reaction tube through which a microwave is transmitted and synthesizing a multi-element compound comprising at least one cationic element contained in the cationic precursor and at least one anion element contained in the anionic precursor by providing the microwave to the liquid mixture, wherein the microwave is transmitted from a microwave generator on a first plane parallel to a second plane on which the reaction tube is on, and the first and second planes are perpendicular to a thickness direction of the microwave generator, the thickness direction being parallel to the transmission direction of the microwave, and wherein an extension direction of the reaction tube is on the second plane.

16. The method of claim 15, wherein the cationic precursor contains at least one of In, Ga, or Al, and wherein the anionic precursor contains at least one of P, As, N, or Sb.

17. The method of claim 16, wherein the multi-element compound is a tri-element compound of GaNP, GaNAs, GaNSb, GaPAs, GaPSb, AlNP, AlNAs, AlNSb, AlPAs, AlPSb, InGaP, InAlP, InNP, InNAs, InNSb, InPAs, or InPSb.

18. The method of claim 16, wherein the multi-element compound is a tetra-element compound of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, or InAlPSb.

19. The method of claim 15, wherein the mixing is performed at about 100° C. to about 150° C., and wherein the synthesizing of the multi-element compound is performed at about 250° C. to about 350° C.

20. The method of claim 19, further comprising cooling the synthesized multi-element compound.

* * * * *